Oct. 5, 1937.　　　A. M. WILHELM ET AL　　　2,095,208
LANDING INDICATOR FOR AIRPORTS
Filed May 6, 1931　　　10 Sheets-Sheet 1

Inventors
Arthur M. Wilhelm,
Edwin L. Rose,
By Bean, Brooks & Henry.
Attorneys

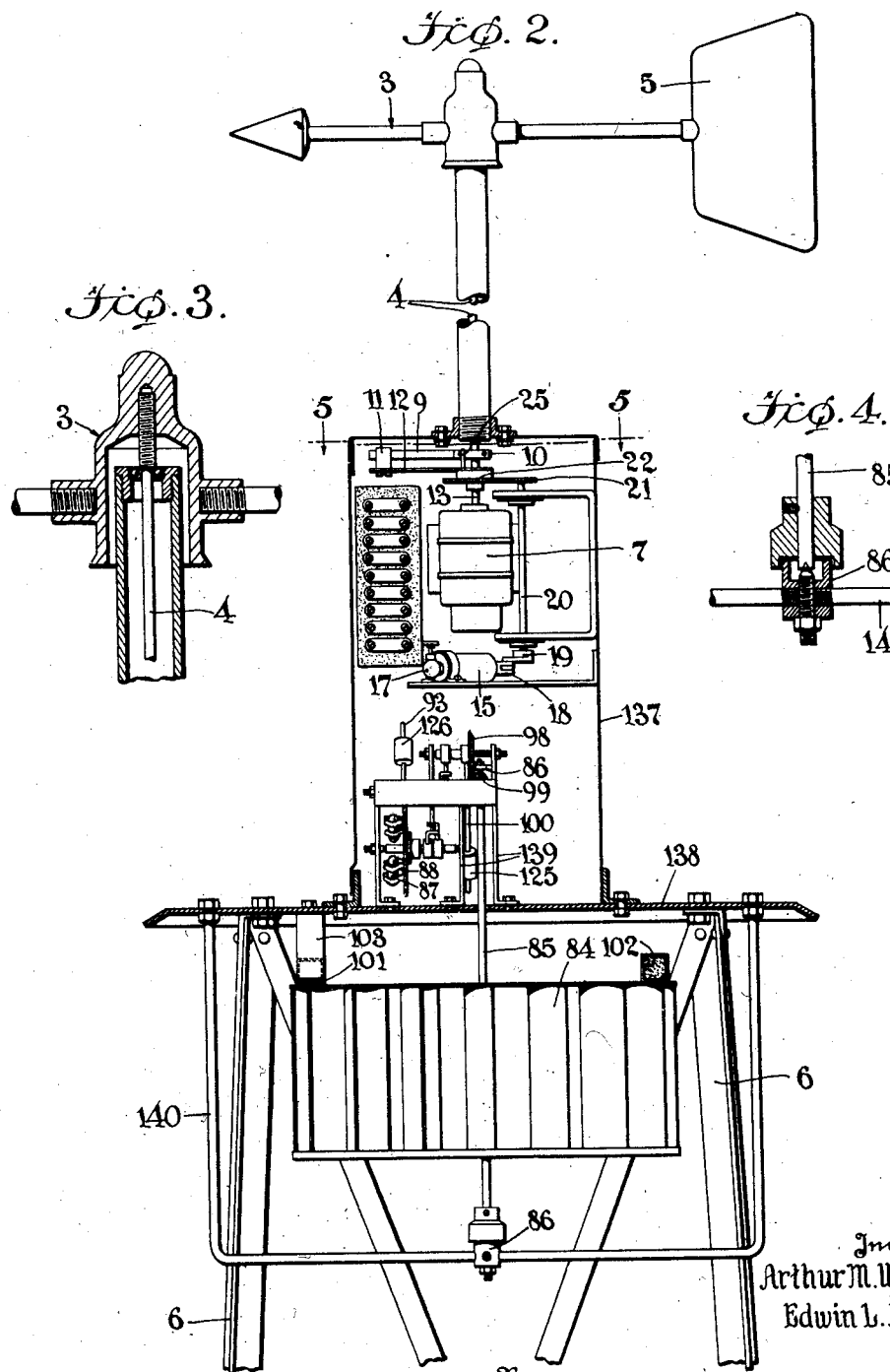

Oct. 5, 1937.  A. M. WILHELM ET AL  2,095,208
LANDING INDICATOR FOR AIRPORTS
Filed May 6, 1931   10 Sheets-Sheet 3

Inventors
Arthur M. Wilhelm,
Edwin L. Rose,
By Bean, Brooks + Henry.
Attorneys

Oct. 5, 1937.  A. M. WILHELM ET AL  2,095,208
LANDING INDICATOR FOR AIRPORTS
Filed May 6, 1931    10 Sheets-Sheet 4
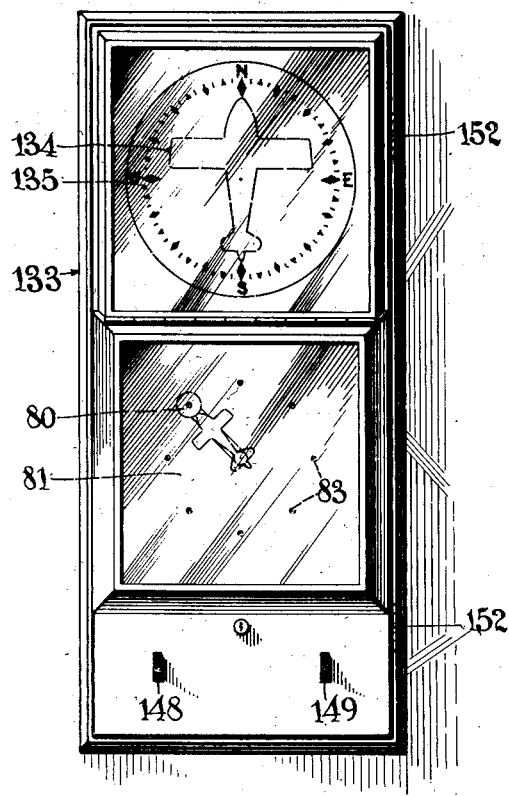
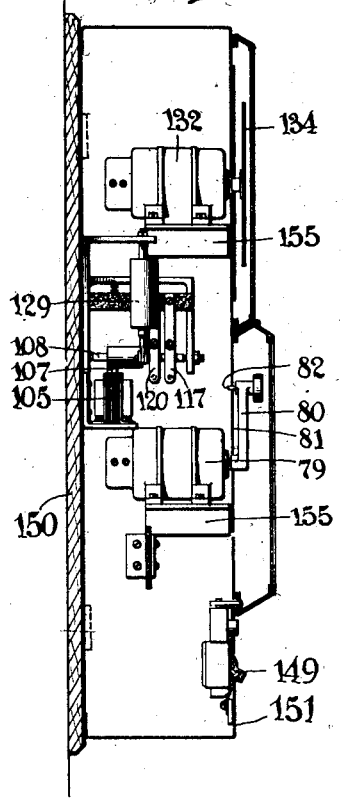
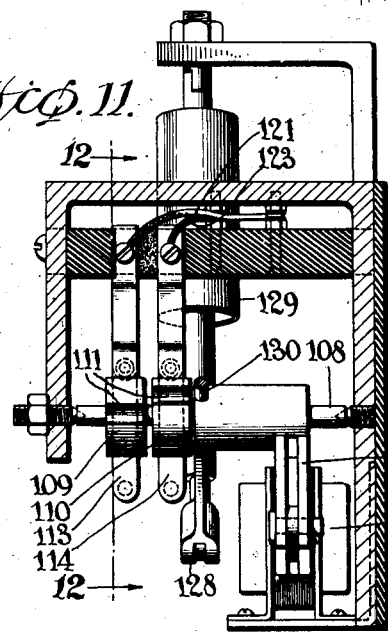
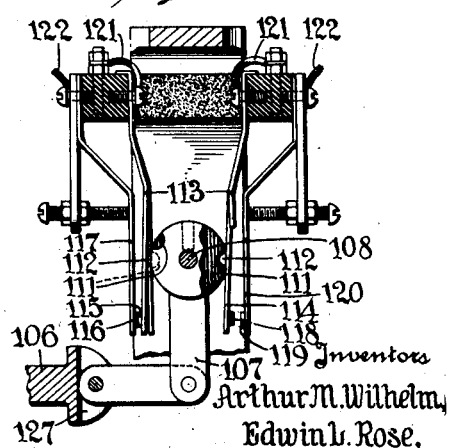
Inventors
Arthur M. Wilhelm,
Edwin L. Rose,
By Bean, Brooks & Henry.
Attorneys

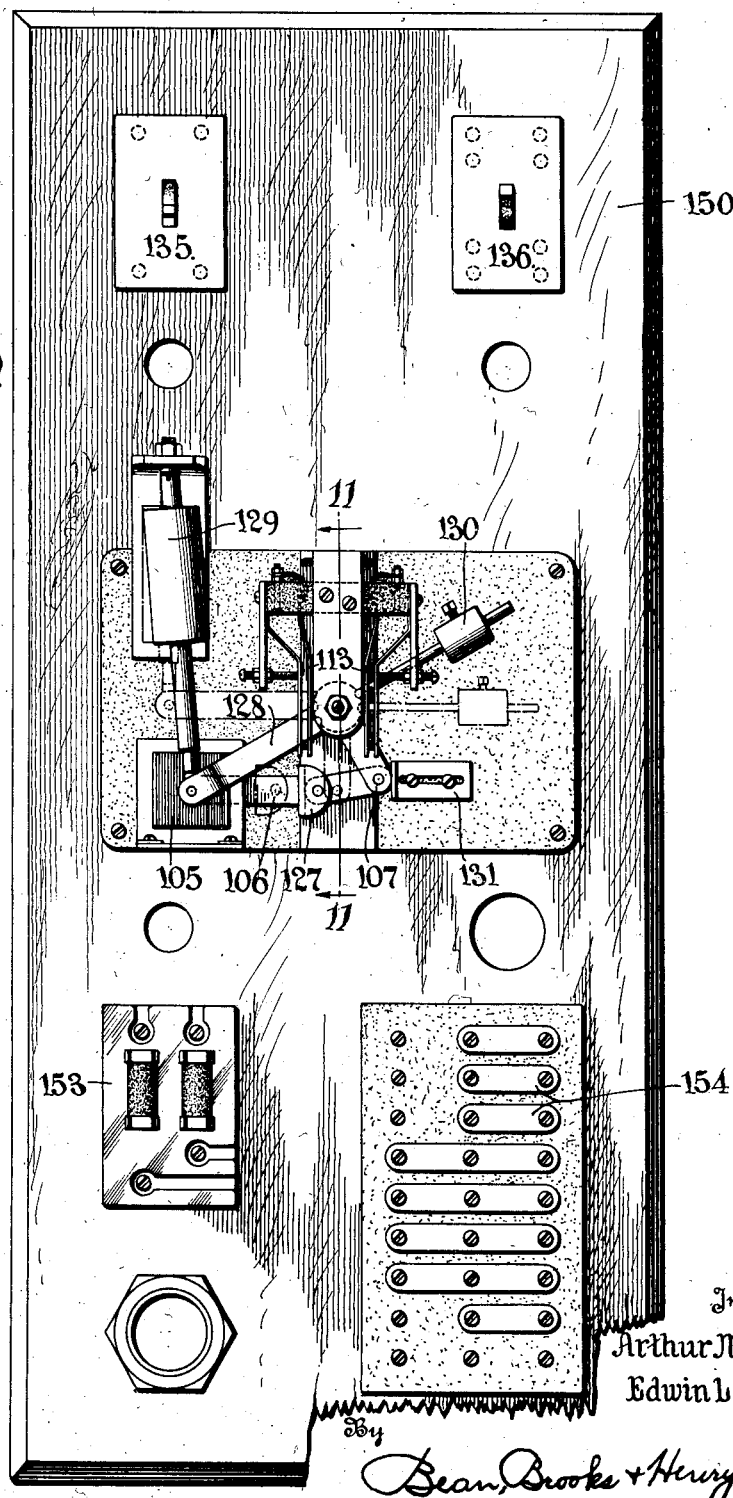

Oct. 5, 1937.      A. M. WILHELM ET AL      2,095,208
LANDING INDICATOR FOR AIRPORTS
Filed May 6, 1931      10 Sheets-Sheet 6
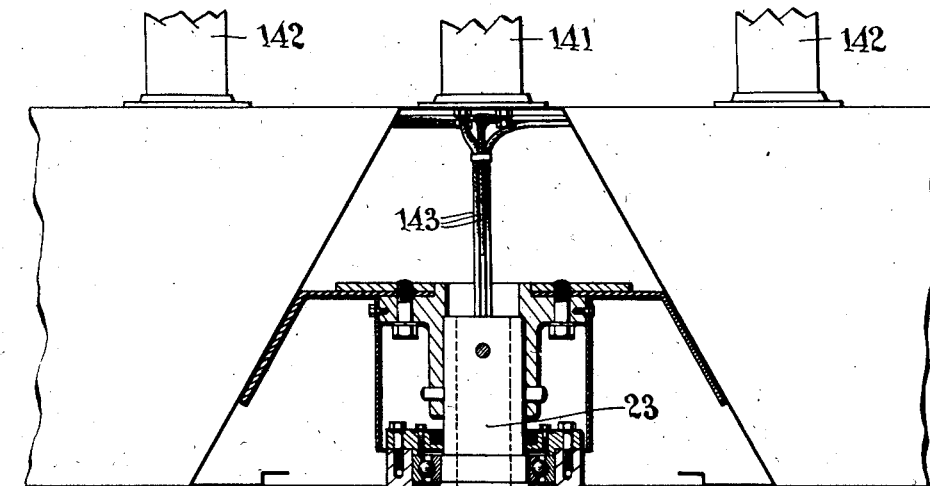
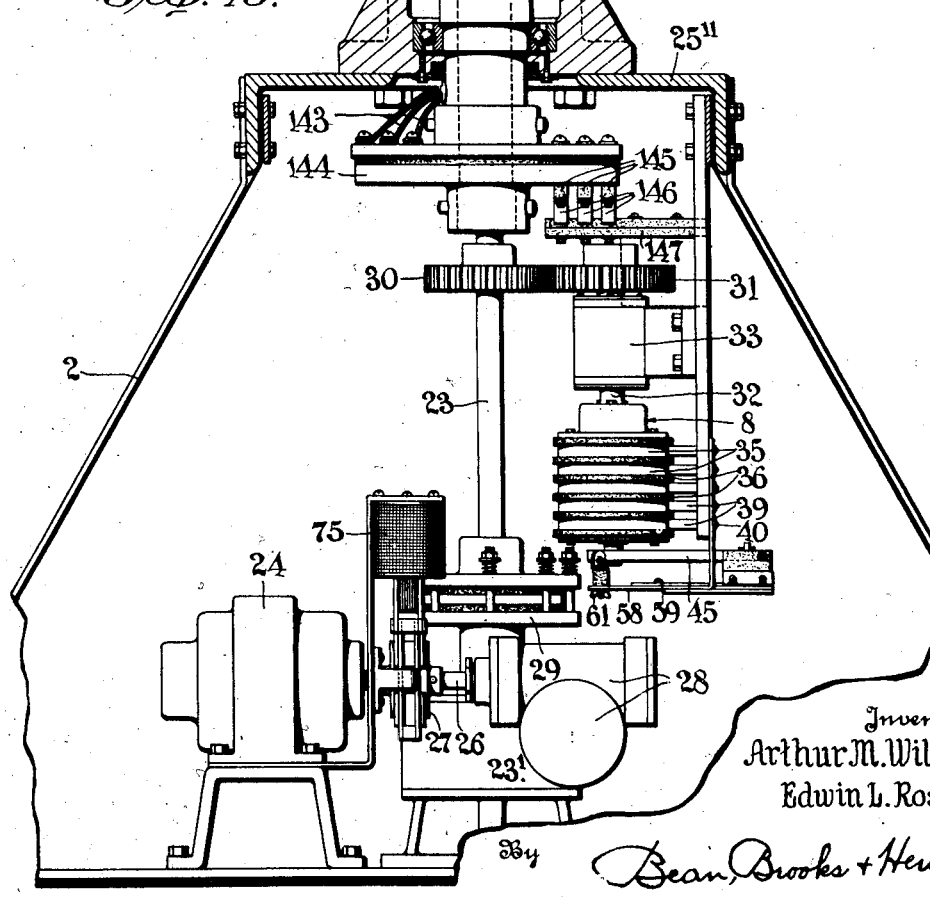

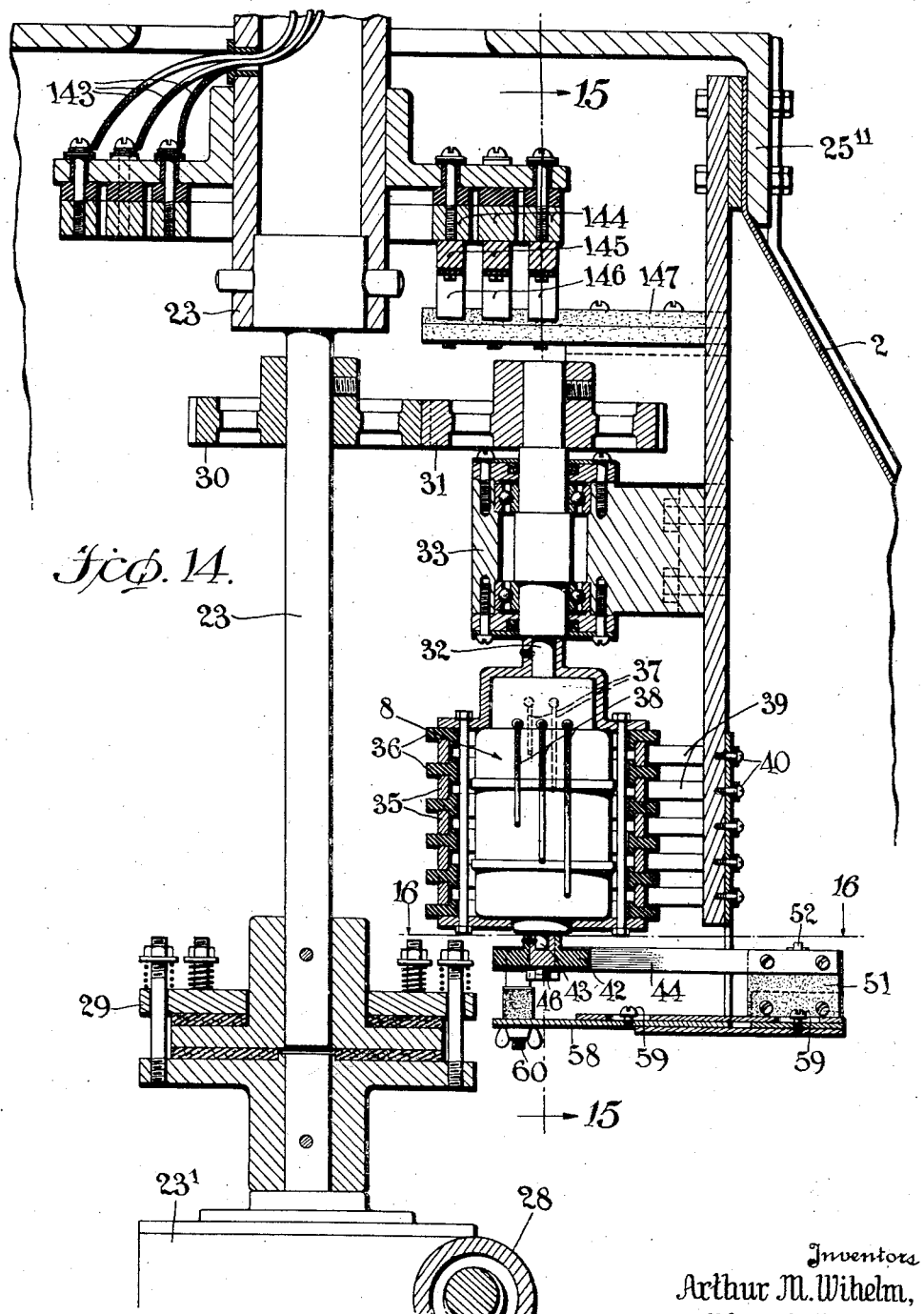

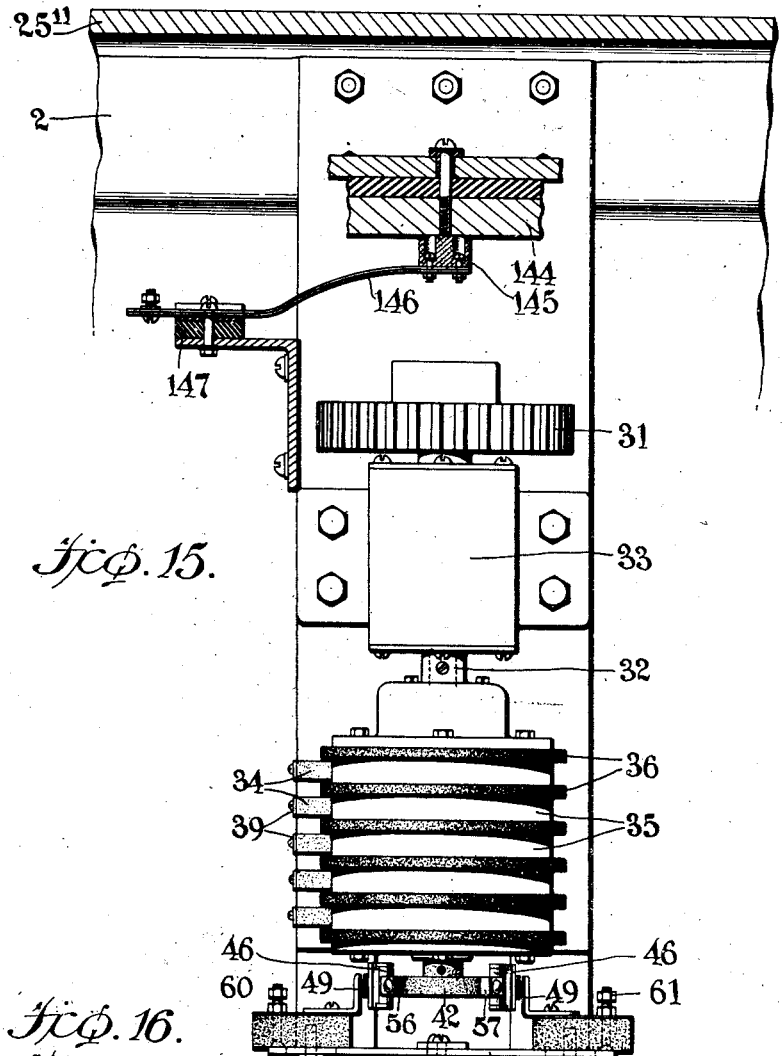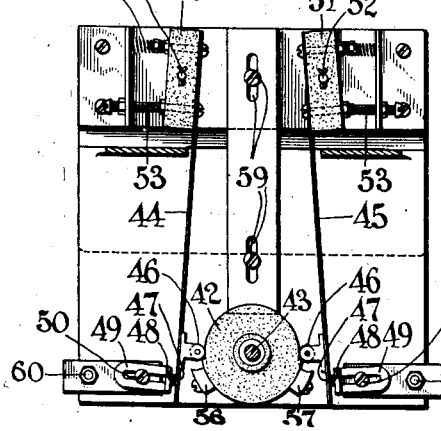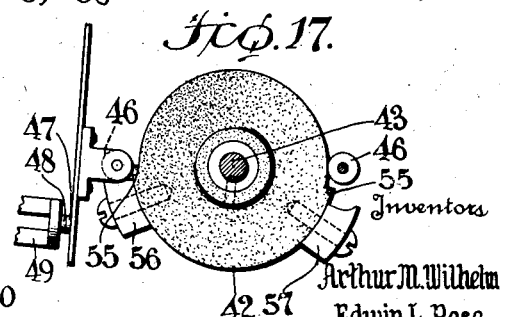

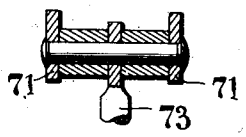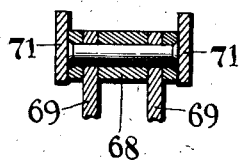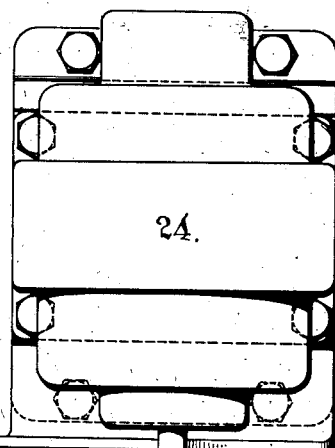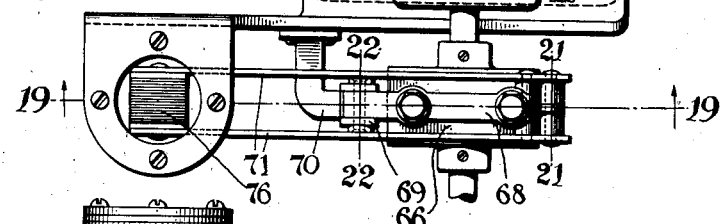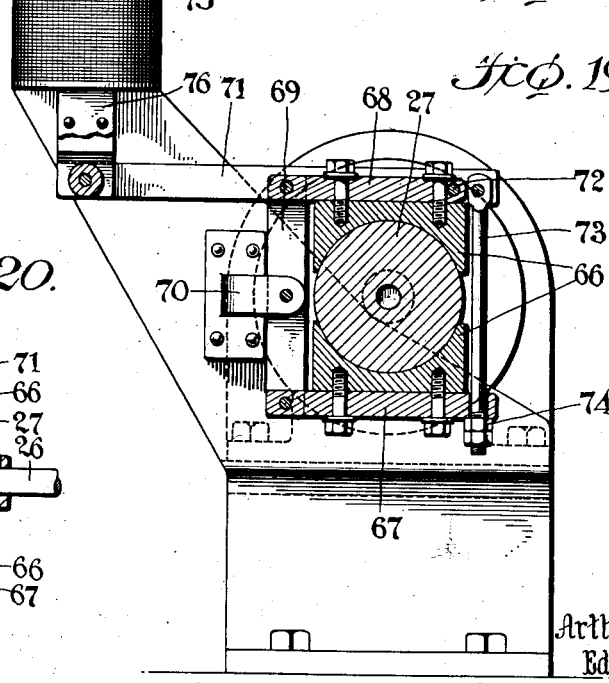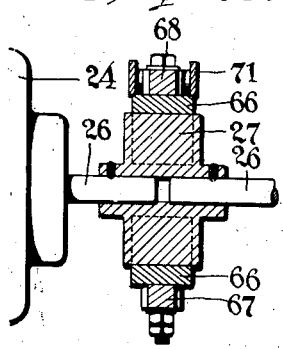

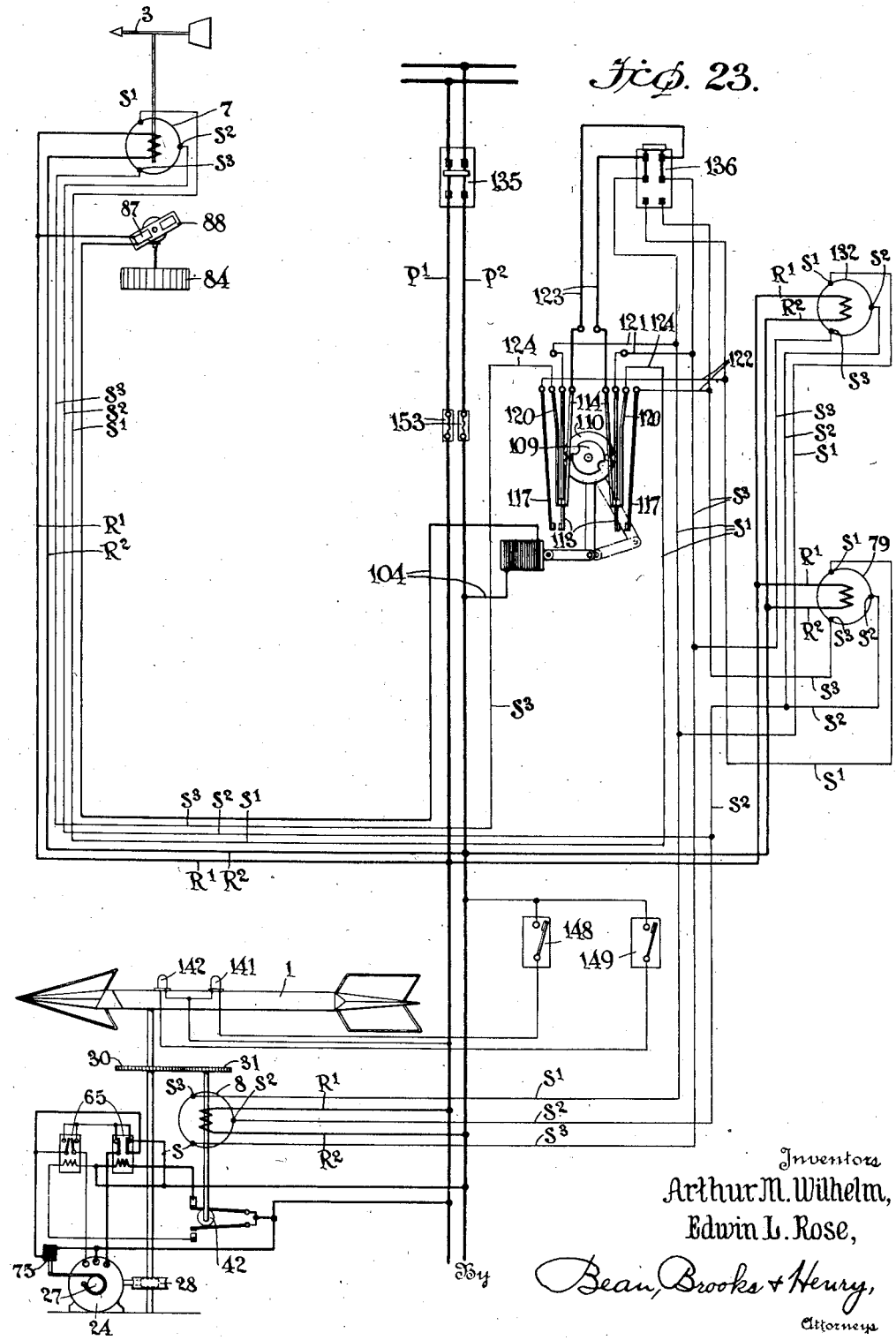

Patented Oct. 5, 1937

2,095,208

UNITED STATES PATENT OFFICE 2,095,208

LANDING INDICATOR FOR AIRPORTS

Arthur M. Wilhelm, Randolph, N. Y., and Edwin L. Rose, Cambridge, Mass.; said Rose assignor to said Wilhelm Application May 6, 1931, Serial No. 535,530

8 Claims. (Cl. 177—352)

This invention relates to a landing indicator for airports by means of which the flying aviator is apprised of the best direction in which to land his aircraft, safety being the dominant factor.

It is quite customary to use wind socks and freely pivoting vanes or T's at airports for indicating to the flying aviator the direction of the prevailing wind currents and thereby enable him to land his airplane with greater safety. In the absence of objectionable wind currents or during calm weather, it may be desirable to land the airplane along a preferred runway, or in a preferred direction, but the flying aviator has no assurance of having such preferred runway or direction indicated to him because of the fact that the wind sock or the freely pivoting T remains in the position in which the dying wind left it, and in fact, with the freely pivoting T, the aviator has no means of ascertaining whether or not a calm is prevailing. Furthermore, to be readily discernible from the air the wind T should be of large dimensions but any increase in dimensions is made at a sacrifice of the sensitiveness of the T to the wind currents owing to the weight of the T body.

It is the object of the present invention to provide a wind T or indicating member, embodying appropriate dimensional requirements for being readily discerned from the air, which will be highly sensitive to the wind currents and automatically returned to a predetermined directional indication in the absence of objectionable wind currents. It is further the object of this invention to provide a sensitive pilot control for the indicating member together with means for maintaining the two substantially in positional agreement, and further, to provide a dependable indicating member upon which the aviator can rely to designate always the preferred or safest direction for landing his airplane in the then prevailing weather conditions.

In the drawings:

Fig. 2 is a vertical section through the pilot and automatic return controls, parts being left in elevation.

Fig. 3 is a detailed sectional view clarifying the mounting of the pilot member or vane.

Fig. 4 is a detailed section through the mounting of the lower end of the wind wheel shaft.

Fig. 8 is an elevation of the control panel.

Fig. 9 is a vertical section through the control panel.

Fig. 10 is an elevation of the base of the control panel with the cover or casing removed.

Fig. 11 is a sectional view about on line 11—11 of Fig. 10, with portions left in elevation.

Fig. 12 is a transverse section about on line 12—12 of Fig. 11, broken away at one side.

Fig. 13 is a fragmentary vertical section through the indicating T and its supporting base, portions being in elevation.

Fig. 14 is a fragmentary sectional view through the base of the indicating T, on an enlarged scale.

Fig. 15 is a detailed view about on line 15—15 of Fig. 14.

Fig. 16 is a transverse sectional view on line 16—16 of Fig. 14.

Fig. 17 is a fragmentary enlarged view of the cam portion in Fig. 16, depicting the cam closing one of its switches.

Fig. 18 is a plan view of the T-propelling motor and its brake mechanism.

Fig. 19 is a transverse section on line 19—19 of Fig. 18.

Fig. 20 is a sectional view through the brake mechanism at right angles to the plane of section of Fig. 19.

Figure 1:
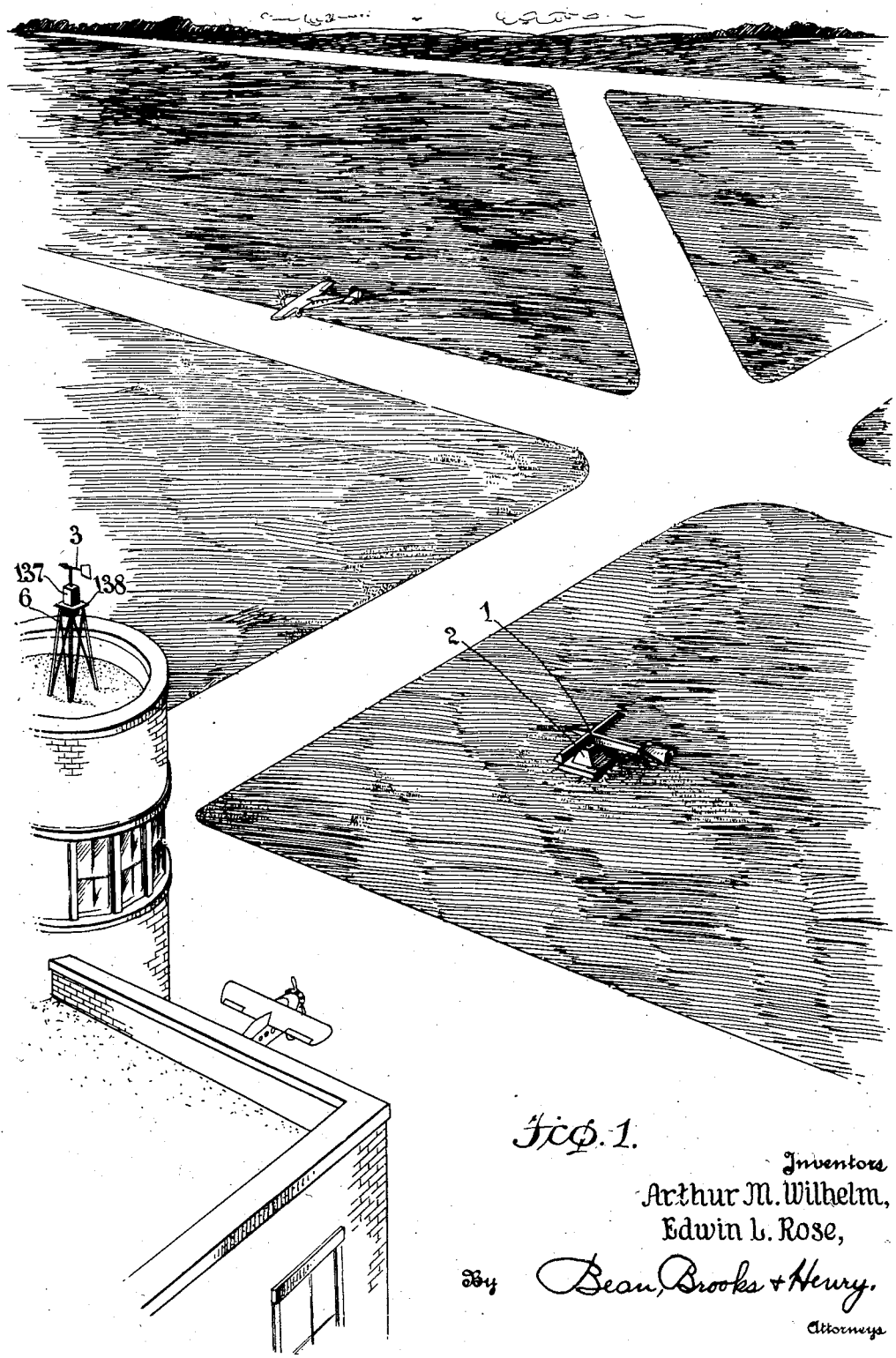
Fig. 1 is a bird's eye view of an airport depicting one embodiment of our invention.
Figure 5:
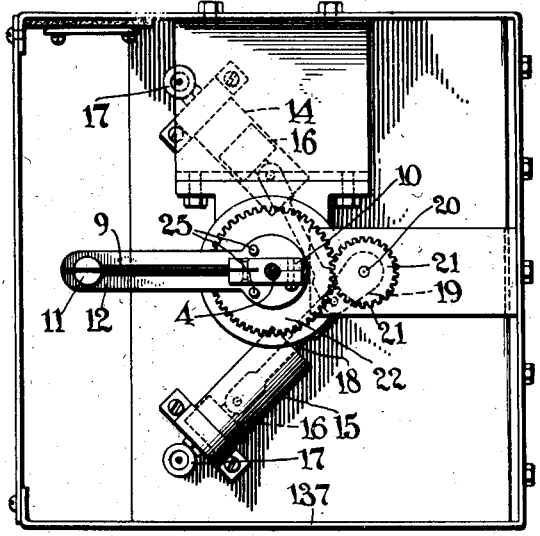
Fig. 5 is a horizontal section about on line 5—5 of Fig. 2.
Figure 7:
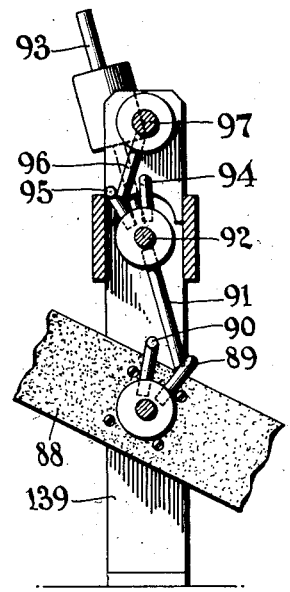
Fig. 7 is a vertical section therethrough illustrating the action of said automatic switch.

Figs. 21 and 22 are detailed sectional views on lines 21—21 and 22—22 of Fig. 18.

Fig. 23 is a wiring diagram of the landing indicator.

In proceeding in accordance with the present invention, the numeral 1 designates the T or indicating member which is mounted upon a base 2 for movement about a vertical axis to indicate the direction in which a landing is to be effected. The term "T" is used herein in a generic sense to include suitable means of indication. The T is made on a scale so as to be readily discerned or located from the air. In practice this T may extend upwards of twenty-five feet in length, and since the larger the body of the T is constructed the heavier it is and the greater is its resistance to the wind currents. To render the indicating T highly responsive to the wind, we provide a sensitive pilot means which will readily respond to the wind currents, and through this responsive action of said pilot means set in motion mechanism for moving the T into positional accord with that of said pilot means.

Such pilot means, in the present disclosure, embodies a vane 3 pivotally supported by a vertical shaft 4 and having a tail or vertical fin 5 by which the vane is caused to respond to the wind. This pilot vane may be mounted in a desired position best suited for the conditions. By preference, we propose to mount the vane upon a tower 6 or other structure by which the vane is disposed in the path of the wind currents unaltered by adjacent buildings about the airport. The vane 3 is connected to a self-synchronous motor 7.

This self-synchronous motor may be termed the transmitter and is electrically interconnected to a similar T-controlling motor 8 which acts as a receiver to reproduce in the T any angular movement which is imparted to the transmitting motor 7 by the pilot means 3. The self-synchronous motors herein referred to are standard and have their rotors wound with single-phase windings and their stators with three-element or phase, Y-connected windings. Excitation is single-phase and is furnished to the rotor winding. The principle of operation of the self-synchronous motor is well known and needs no elaborate discourse herein.

Therefore, with the transmitter 7 and the receiver 8 interconnected to obtain positional accord between the two, any movement of the pilot vane will excite and place the motor 7 out of balance or synchronism with the motor 8 and thereby cause the latter to reproduce the motion of the motor 7. This reproduced motion is taken advantage of to set in motion the mechanism hereinafter described for bringing the T into positional agreement with the wind-positioned pilot vane.

The pilot vane, being very sensitive to the wind currents, may whip back and forth in the wind currents and thereby disrupt its positional accord with the T. Such whipping appears to be due to momentary wind variations as distinguished from prolonged or substantial changes in the direction of the wind. To avoid this whipping having any influence on the positional relationship between the motors, or varying the position of the T except upon a prolonged change in the wind direction, there is interposed between the pilot vane and the motor 7 a play connection which will accommodate and preferably also yieldably resist the whipping. This connection embodies resilient means which yield to the whipping and which will, in the event that the pilot vane is sustained to one side or the other of its normal with respect to the T, act to impart the sustained degree of movement to the transmitter and thereby result in a following movement of the T to restore the positional accord.

In the present disclosure this resilient connection embodies a leaf spring 9 anchored at one end, by a clamp 10, to the shaft 4 and having its opposite end connected to a crank pin 11 on the arm 12, said arm being connected to the rotor shaft 13 of the motor 7. This connection is a yieldable one, permitting the spring 9 to flex to either side of a normal position. The extent of yieldability may be determined by limit stops 25.

Means are provided for dampening the action of any sudden movement of the pilot vane on the rotor shaft 13. This means may consist of a pair of dash pots 14 and 15 having plungers 16, controlled in their movement by bleed valves 17. In the particular showing the plungers are connected by their rods 18 to a crank arm 19 carried on a shaft 20. Fixed on the shaft is a gear 21 meshing with a second gear 22 which is fixed on the rotor shaft 13 so that movement imparted to the rotor shaft by the resilient coupling 9—12 will be dampened by the dash pot action if the imparted movement is of sufficient intensity to move the plungers 16 faster than the dashing fluid will permit.

Referring now in particular to the indicating member or T 1 (Figs. 13 and 14), the body of said T is supported by a shaft 23 for angular motion about a substantial vertical axis and has such angular motion imparted to it by a suitable power device such as a reversible electric motor 24 arranged in the base 2. The motor shaft 26 carries a brake wheel 27 to be referred to hereinafter and also a worm or other type of gear constituting a part of a speed reduction transmission 28. The lower end of the shaft 23 carries a gear (within case 23') constituting the driven end of the transmission 28, the T shaft being given intermediate support by means of bearing 25' provided on the base cap 25''. A friction clutch 29 is interposed between the shaft 23 and the transmission 28 to permit manual movement of the T without injury to the drive mechanism.

Fixed on the T shaft 23 is a gear 30 meshing with another gear 31 carried on the shaft 32 of the motor 8. The shaft 32 is journalled in a bracket 33 from which the receiver 8 is suspended. The reason for suspending the motor by the shaft 32 is to permit and take advantage of movement of both the rotor and the stator elements of the same. The term stator with respect to the receiver 8 is used for ease in describing and referring to the part which surrounds the rotor and contains the poly-phase windings, and which is usually mounted in a fixed position. Since the receiver 8 is suspended so that the stator may also rotate it is preferred to make the wiring connections with the stator and rotor windings through the brushes 34 and collector rings 35, the latter being insulated by rings 36 and electrically connected to the respective windings as by the wires 37 and 38. The brushes 34 are held in yielding contact with the rings by the brush supporting springs 39 which also conduct the current to the terminal posts 40 from which conductors 41 extend to like points on the pilot motor 7 so that like points of the windings of the two motors are electrically interconnected. The brush and ring contacts enable free movement of the stator element unobstructed by loose wire connections leading from the motor windings.

Since the motor 24 is of the reversible type we provide a double switch under the control of the receiver which switch is clearly shown in Figs. 16 and 17, wherein is depicted one type of switch which will serve the purpose intended. This switch construction comprises a switch closing element in the form of a cam disc 42 fixed to the lower end of another shaft 43 also connected to the receiver 8. Of the two motor shafts, one is connected to the stator and the other is connected to the rotor of the receiver motor. One shaft suspends the receiver and the other shaft operates the cam disc 42. The cam disc is interposed between a pair of contact members 44 and 45 each carrying a roller 46, for riding on the cam 42, and a contact point 47, for circuit-closing engagement with a second contact 48 carried by an adjustable contact member 49. Adjustment of member 49 may be obtained by the screw and slot mounting 50.

The contact members 44 and 45 preferably are inherently resilient, and may therefore be in the form of leaf springs so as to yieldably hold their rollers 46 in yielding contact with the cam 42. The degree of tension under which the rollers are held may be determined in the mounting of the contact members 44 and 45, and to this end they are each fixed to an anchor member 51 pivotally mounted at 52, the position of the anchor member being adjusted by a set screw 53 engaging the latter at one side of the pivot 52, against a cushioning spring 54 supported against the anchor member at the opposite side of its pivotal support. Adjustment of the spring tension in the contact members 44 and 45 will vary the pressure of the rollers 46 on the cam 42 which will, in turn, vary the resistance offered against the turning of the cam, as will now be set forth.

The cam is provided with a shoulder 55 at the base of which the rollers 46 normally rest when the two motors 7 and 8 are in synchronism or at rest. Now when the self-synchronous motors are excited, as when the wind turns the pilot vane 3 sufficient to turn the rotor of the transmitter 7, the receiver 8 will have an urge tending to turn the cam 42 sufficiently to bring the two motors again into positional agreement. This tendency of the cam 42 to turn, when of sufficient urge to cause the particular shoulder 55 to ride under the roller 46, (which results in pressing the respective spring contact member 44 or 45, depending upon the direction of rotation of the cam) rotates the cam until arrested by one of the stops 56 or 57 whereupon the urge holds the respective roller in engagement with its cam stop. In this arrested position the respective contact point 47 is in circuit closing relation with the contact point 48 to thereby close the circuit of the motor 24 so that the latter will rotate in the proper direction to bring the indicating T 1 into directional accord with the pilot vane 3. When positional agreement is thus established between the indicating T and the pilot vane the two motors 7 and 8 will likewise be brought again into balance through the gearing 30, 31, the latter rotating the stator element of the motor 8 until the balance is obtained, whereupon the disc 42 will move with the gear 31 until the shoulder 55 passes from beneath the elevated roller 46. This will break the circuit of the motor 24 through the separation of the heretofore engaged contact points 47 and 48.

It will thus be seen that the resistance offered by the rollers 46 to the turning of the cam 42 will in effect determine the neutral point and control the degree at which the unbalance relationship between the motors 7 and 8 is had, and this will also aid in determining the extent to which the pilot vane may whip without influencing the indicating T. Adjustment of the set screws 53 will vary this tension or roller pressure and the resistance offered to the receiver 8 responding to any slight unbalanced relationship it may momentarily have with respect to the transmitter 7.

The adjustable contact members 49 are carried by a supporting plate 58 which is adjustable through suitable means 59, and by means of binding posts 60 and 61 the circuit wires 62 and 63 from the opposite sides of the reversible motor 24 are electrically connected to the contact members 49. The third wire 64 from the reversible motor 24 is connected to the spring contact members 44 and 45. To avoid too much current passing through the contact points 47 and 48, it is preferred to introduce a relay 65 in each of the two circuit wires 62 and 63 which will serve to close the proper circuit through the reversible motor.

When the two motors 7 and 8 are brought into balanced relation or positional agreement a braking mechanism is brought into action to arrest the indicating T against overriding and also to hold the indicating T against any whipping action under the influence of wind currents. This braking mechanism is illustrated particularly in Figs. 18–22, and embodies, according to the present showing, a pair of brake shoes 66 supported by levers 67 and 68 which are in turn pivoted to a supporting bar 69. This bar receives pivotal support from a bracket 70, and by reason of this mounting the shoes 66 will properly seat upon the periphery of the brake drum 27. A brake applying lever 71 is pivotally connected to the free end portion of the arm 68 by a pin 72 and beyond this connection said lever 71 is connected to the lever or arm 67 by a rod 73 which passes downwardly through an opening in the lever 67 and carries adjusting nuts 74 to take up the brake shoes with respect to the drum. Obviously lifting the long arm of the lever 71 will remove the brake shoes from the drum, while a downward movement of said lever 71 will draw the shoes into braking relation with the drum. An electro-magnet or solenoid 75 has its armature 76 pivotally connected to the longer arm of the brake lever 71, as indicated at 77, and when the magnet is deenergized the weight of the longer arm together with the weight of the armature 76 will provide sufficient pressure to effectively brake the movement of the indicating T and cause the latter to come to rest. When the solenoid is energized its armature will be attracted to lift the adjacent end of the lever 71 and release the brake. Therefore it is desired to have the solenoid automatically energized with the closing of the circuit of the motor 24 and to this end the circuit wires 78 of the solenoid 75 are connected into this motor circuit.

The operation of the landing indicator thus far described is as follows:—

Assuming that the pilot vane and the indicating T are in positional agreement, when a contrary wind impinges upon the vertical plane 5 of the pilot vane and turns the latter the spring arm 9 will be placed under tension. If this action is sudden the spring will then urge the arm 12 to follow which urge will be momentarily checked or resisted by the dampening action of the dash pots 14 and 15. This dampening action will gradually become dissipated to permit the arm 12 to follow the spring arm 9, thereby moving the rotor of the transmitter 7 out of balance with the receiver 8. This positional disagreement results in excitation of the motor 8 to move the respective one of the spring contact members 44 (45) into circuit closing position whereupon the motor 24 is correspondingly set in action and through the transmission 28 rotary movement is imparted to the indicating T 1. This movement will continue until, through the gears 30 and 31, the motor 8 is again brought into balance with the motor 7 whereupon the cam 42 will release the active spring contact member to open the reversible motor circuit and deenergize the solenoid 75, whereupon the brake 66 will become effective to arrest the indicating T.

Any whipping of the pilot vane will initially be taken care of through the resiliency of the spring arm 9, as resisted by the dampening action of the dash pots 14 and 15, and then further absorbed by the resistance offered through the spring contact members 44 and 45, this resistance occurring when the motors 7 and 8 are slightly out of balance, but any whipping action which is taken care of solely by the spring arm 9 does not affect the self-synchronous motors.

While it is essential, in making a landing, to bring the airplane down "into the wind", the direction from which the wind was last blowing may not always be the best for landing in the absence of the wind. For instance, airports are provided with various runways of which one may be preferred over another, when the wind is not the controlling factor, and therefore if there is no substantial wind blowing then it is desirable to inform the aviator of such preferred landing condition. Utmost dependability is obtained by having the indicating T automatically returned to a position for indicating the preferred runway when a calm prevails. Making it automatic obviates the human element. The automatic return apparatus will now be described.

Preferably in the control room or office at the airport, is located a control panel (Figs. 8–10) and on this panel is arranged a manual control by which a calm weather landing direction may be readily predetermined and selected. This control embodies a motor 79 to the rotor shaft of which is connected a handle 80 movable over a dial 81 and adapted to be secured in a set position by dropping the pin 82 in a selected one of the recesses 83 provided in the dial. Points of the windings of this motor 79 are electrically interconnected to like points on the receiver motor 8 of the indicating T, and this interconnection is made through a wind control switch by which the manually set motor 79 is automatically disconnected from the motor 8, in the presence of predetermined wind currents, and is automatically connected with said motor 8 in the absence of such wind currents.

This wind controlled switch, according to the present disclosure, embodies a bladed wheel 84 disposed in a position to be acted on by the wind currents, as on the tower 6. This wheel is mounted on a shaft 85, journalled in suitable bearings 86 so as to be sensitive to the wind currents, and the shaft is connected to cooperate with the switch for throwing one of the motors, 7 or 79 out of, and the other into, operative relationship with the motor 8.

Figure 6:
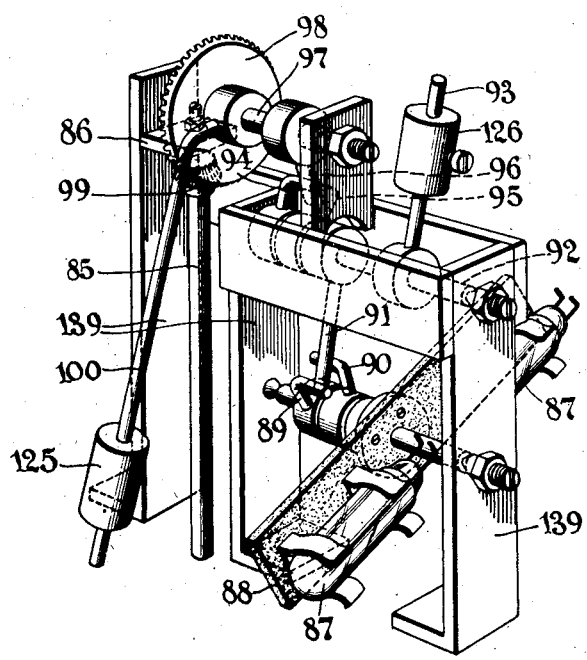
Fig. 6 is a perspective view of the automatic return control switch.

In Fig. 6 this switch is shown of the mercury type in which the tube 87, containing the circuit closing globule of mercury is mounted on a rockable support 88. One or more of these tubes may be provided, two being herein illustrated to balance the support 88. This support 88 is mounted to rock from an inoperative to an operative position in which latter the circuit between the motors 7 and 8 is closed and the circuit between the motors 79 and 8 is opened. In the inoperative position the switch opens the transmitter-receiver circuit and closes the circuit between the motors 8 and 79. A pair of stop shoulders 89 and 90 are connected to the support 88, and between these shoulders is disposed an arm 91 carried by a shaft 92. This shaft also carries a weighted arm 93 which is fixed with respect to the arm 91 and is likewise fixed with respect to a pair of stop shoulders 94 and 95 on the shaft. Between these latter shoulders extends an arm 96 carried by a shaft 97 on which a gear wheel 98 is provided in meshing relation with a pinion 99 carried by the wind-wheel shaft 85. The shaft 97 is also provided with a weighted arm 100 which tends to hold the shaft in its normal or inoperative position.

The wind wheel 84 is provided with a pair of spaced stop lugs 101 and 102 which are adapted to engage at different times an interposed arresting stop 103. Through the gearing 98 and 99 the weighted arm 100 acts to hold the wind wheel 84 in its normally inoperative position in which the stop lug 101 is in engagement with the arresting stop 103. In the presence of a wind the wheel 84 will be blown about its vertical axis until arrested by the lug 102 contacting the stop 103 against which the wind will hold said lug, and in this position the weighted arm 100 is elevated and ready to return the wheel to its normal position when the wind dies down. During this wind actuated movement of the wheel 84, and shaft 97, the lug 96 is brought into operative engagement with the lug 95 to impart pivotal movement thereto sufficient to bring the weighted arm 93 across the dead center position, which is the vertical plane passing through the longitudinal center of shaft 92. After moving across dead center the weighted arm carries the arm 91 quickly along with the shoulder 89 thereby to tilt the support 88 to its operative position in which the mercury switch 87 closes the circuit through the conductors 104 by which the motor 7 is electrically connected with the motor 8 and the motor 79 is disconnected, in a manner now to be described.

The wind switch 87 is also connected in circuit with a solenoid 105 through the wires 104, and the armature 106 of the solenoid is connected to an arm 107 fixed to a shaft 108. Fixed on this shaft is a pair of cams 109 and 110 having peripheral pockets or recesses 111 to receive lugs 112 carried by spring contact members 113 and 114. The recesses 111 on the disc 109 are staggered or offset relative to those in the periphery of the disc 110 so that in one position of the armature 106 the lugs 112 on the contact members 113 will be received within the recesses 111 of their cooperating cam, while the lugs on the contact members 114 are out of their recesses and are bearing on the periphery of their cam. The cam 109 is disposed between a pair of the contact members 113 and cooperates with each, while the cam 110 is likewise disposed between a pair of contact members 114 and has like cooperation with each of the latter, so that as the respective lugs 112 are cammed outwardly by the cam 109 contact point 115 carried by each spring contact arm 113 is brought into electrical contact with a like point 116 carried by an associated contact member 117. During this circuit closing operation between the contact points 115 and 116 like points 118 on the contact arms 114 are disengaged from contact points 119 on associated contact members 120. Upon rotation of the shaft 108 in the reverse direction a reverse disposition of the contact points 115, 116 and 117, 118 will take place.

Conductors 121 and 122 connect the contact members 113 and 117 with the stator windings of the motors 8 and 79, while circuit wires 123 and 124 connect the contact members 114 and 120 in circuit with the stator windings of the motors 7 and 8. With the wind actuated switch 87 in a normally inoperative position the motors 8 and 79 will be electrically interconnected through the closing of the contact points 115 and 116, and in a prevailing wind of sufficient intensity to render the wind switch operative the contact points 115 and 116 will be separated to disconnect said motors 8 and 79, and the motors 7 and 8 will be interconnected through the contact points 117 and 118.

The intensity of the wind required to actuate the switch 87 is determined by the position to which the weight 125 is adjusted on the arm 100, supplemented by the adjustment of the weight 126 on the arm 93. Therefore when the wind actuated switch 87 is rendered operative the solenoid 105 attracts its armature 106 to impart rotary movement to the shaft 108. The extent of this rotary movement is determined by a stop 127 on the armature, designed to abut a fixed part of the solenoid. When the wind dies down below the predetermined velocity, sufficient to cause the weight 125 to restore the switch 87 to an inoperative position, the solenoid 105 will become deenergized and the shaft will be given an opposite turn through the weight of the arm 128 which is also fixed to the shaft 108. This return movement is dampened and retarded by a dash pot 129. A weighted arm 130, also fixed to the shaft 108, may be provided to control this movement. A stop 131 can be provided to limit the return movement.

A telltale self-synchronous motor 132 may be provided on the control panel 133 in the operating room with its rotor shaft carrying a pointer 134 for operating over a dial 135', and this telltale motor 132 is electrically interconnected with the receiver 8 so as to indicate on the dial the position of the T. The motor 132 is preferably connected permanently with respect to the T motor 8 so that the pointer 134 will always indicate the position of the indicating T whether the latter is in circuit with either the pilot motor or the manually set motor.

The control panel may also be equipped with the main current supply switch 135 and a manual throw switch 136, the latter being interposed in the circuit to permit the manual throwing in and out of the motors 7 and 79 with respect to the T motor 8. By this arrangement the T may be rendered solely manual or solely automatic in action.

The control panel is herein illustrated as comprising a base 150 and a cover 151 mounted thereon, as by means of hinges 152. The cover is preferably in the form of a hollow casing so that when it is closed against the base the two cooperate to enclose the parts carried by the control panel. The automatic switch actuated by the solenoid 105 may be mounted directly on the base 150 along with the main switch 135 and the manual throw switch 136. In Fig. 10 the base is also equipped with fuse connections 153 for inclusion in the main incoming circuit wires. The several conductors of the apparatus may be conveniently connected through the bus bars 154. The motors 79 and 132 are supported by brackets 155 within the cover 151, with their rotor shafts projecting through the front wall of the cover to support the handle 80 and the pointer 134, respectively.

The pilot arrangement upon the tower 6 is in a compact assembly, with the pilot motor 7 and the wind actuated switch mechanism, excepting the wind wheel 84, enclosed by a casing 137 upon the platform 138. Suitable standards or frame members 139 are carried by the platform 138 to support the wind actuated switch structure and provide journal bearings for the shafts thereof as well as for the upper end of the shaft 85. The lower bearing 86 is conveniently carried by means of a strap support 140 so as to provide ample exposure of the wheel 84 to the wind currents, the tower 6 being of skeleton frame formation for similar reasons.

For night use the indicating T 1 is illuminated as by means of a series of incandescent bulbs, and to render the same more efficient it is preferred to provide the illumination in "warning" and "clear" colors selectively presentable. To this end we provide a series of red lights 141 and a series of green lights 142 the circuit wires 143 from which are carried down through the tubular portion of the shaft 23 to the collector rings 144. Electrical energy is supplied the ring-engaging brushes 145 resiliently supported by spring arms 146, the spring arms being insulated from each other and supported by a bracket 147 arranged within the base 2 of the indicating T assembly. Conductors connected with these brushes lead to switches 148 and 149 which selectively control the illumination of the red and green series of lights.

In operation, and assuming the throw switch 136 is connecting the indicator for automatic operation, any sustained change in position of the pilot vane by the wind of predetermined velocity will excite the motor 7 until the indicating T is propelled by its drive into substantial positional agreement with the vane. During this actuation the wind wheel 84 is held in a position to render the switch 87 operative and thereby electrically connect the motors 7 and 8 and disconnect the motor 79 from motor 8. As the wind dies down and the wheel 84 returns to render the switch 87 inoperative with respect to the pilot motor 7, the latter will be electrically disconnected from the T motor 8 and the two motors 8 and 79 will be electrically connected with one another whereupon, when at this moment there is positional disagreement between the motors 79 and 8, the T motor will set in motion the T-moving mechanism so as to bring the T into positional agreement with the indicator or handle 80 at which time the solenoid 75 will become deenergized and permit application of the brake 66 to arrest and hold the T in such position. At all times, the telltale motor 132 will display, through the pointer 134, the position of the T. Therefore, the T will always return to a position as predetermined by the manually set motor 79 in the absence of any objectional wind currents.

Obviously if the automatic feature is not desired the throw switch 136 may be manipulated to render the T purely of manual control. With the present invention we are enabled to provide a T of appropriate dimensions to be readily observed from the air and at the same time be highly sensitive to the prevailing wind currents through the pilot control.

The "calm" weather is referred to as including conditions in which the wind velocity is insufficient to actuate the drive for the indicating T. The degree of wind velocity required to set the T mechanism in motion is determined by the resiliency of the spring 9 either solely or jointly with the adjustment of the spring contact members which cooperate with the cam 42. Obviously either one of these two "play" connections may be used independently of the other to vary the resistance offered to the T-moving mechanism. The self-synchronous motor herein referred to is of the type generally found in the trade under the name "Selsyn", and acts in establishing and tending to maintain the parts of the indicator apparatus in positional agreement.

In Fig. 23 we have illustrated the wiring diagram in which the main power lines are represented by the reference characters P1 and P2; the conductors connecting the rotors of the self-synchronous motors by R1 and R2; and the conductors connecting the stator elements of the several self-synchronous motors by the reference characters S1, S2 and S3 by which characters the corresponding points in the stator windings are also designated.

Assuming that there is no wind and the solenoid 105 is deenergized while the double throw switch 136 is in its "automatic" position, the circuit is then through contact fingers 113 and 117, conductors 121 and 122 through their wires S1 and S3 to the manually set motor 79 and to the T motor 8. The telltale motor 132 is always in connection with the T motor.

When the wind rotates the pilot 3 and excites the pilot motor 7 the wind wheel 84 will also close the switch 87 to energize the solenoid 105 and thereby break the circuit through the contact fingers 113 and 117 and close the automatic circuit through the contact fingers 114 and 120. The circuit will then trace from the pilot motor 7 along wires S1 and S3 (124), thence through contact fingers 120 and 114, through conductors 123 to the automatic side of the double throw switch 136 and from thence through wires S1 and S3 to the telltale motor 132 and the T motor 8, cutting the manually set motor 79 out of service.

Now, when the double throw switch 136 is shifted to the manual side, the entire system is then set for a purely manual operation regardless of the action of the pilot. Such position of the double throw switch opens the circuit through wires 123 and closes the circuit from the manually set motor 79 along wires S1 and S3 through the switch 136 and thence by wires S1 and S3 to the T motor 8 and the telltale motor 132, thus, in effect, paralleling the contact fingers 113 and 117 when the latter are connected.

The direction of rotation of any particular receiving motor may be reversed by reversing its conductors S1 and S3. For instance, the T motor 8 is shown as having its leads S1 and S3 reversed. This reversal will, through the gears 30 and 31, provide for corresponding movements in the pilot and T and maintain the desired positional agreement therebetween. Obviously, the T could be disposed directly on the rotor shaft of a fixed self-synchronous motor and accomplish positional accord with the pilot. Such an arrangement would eliminate the necessity of special drive mechanism for the T but would also probably require a heavier self-synchronous motor with an increased consumption in current. This arrangement embodies the spirit and concept of the present invention.

What is claimed is:

1. A landing indicator for airports comprising a relatively heavy rotatable wind direction indicator, pilot means directionally responsive to wind currents, actuating means for moving the indicator to indicate the landing direction, means controlled by the pilot means to cooperate with said actuating means for maintaining positional agreement between the pilot means and indicator when the pilot controlled means is operatively related to said actuating means, preselective means for effecting operation of the actuating means for moving the indicator to a predetermined position when said pilot controlled means and said actuating means are not operatively related, and wind actuated means normally inoperative but operable by a wind greater than a predetermined velocity for establishing an operative relation between the actuating means and said pilot controlled means, said wind actuated means embodying means for disrupting the operative relationship between said preselective means and said actuating means when the pilot controlled means is operatively related to the actuating means.

2. A landing indicator for airports comprising a relatively heavy wind direction indicating member, a pilot responsive to wind currents, electrically actuated means for moving the indicating member into positional agreement with the pilot, manually set means for operating said first means to bring the indicating member into a predetermined position, means under the control of the pilot for controlling the first means to maintain such positional agreement between the pilot and the indicating member, said first means being adapted for connection in electric circuit with said manually set means and with said pilot controlled means, and a wind actuated switch connecting the first means to the manually set means when the wind is below a predetermined velocity and operable by a wind above such predetermined velocity for bringing said first means into electric circuit with said pilot controlled means to the exclusion of said manually set means, whereby said first means will position said wind indicating member in accordance with the said positioned pilot.

3. A landing indicator for airports, comprising a relatively heavy wind direction indicating member, a pilot responsive to wind currents, electric means for moving the indicating member into positional agreement with the pilot, means under the control of the pilot for controlling the first means to maintain such positional accord between the pilot and the indicating member, said pilot controlled means adapted for electric circuit connection with said first means, a manually set means normally in circuit connection with said first means for causing the indicating member to assume a predetermined position in the absence of predetermined wind currents, and wind responsive means operable by such predetermined wind currents for electrically connecting the first means to said pilot controlled means to the exclusion of said manually set means whereby the indicating member is caused to follow the pilot in positional agreement therewith.

4. A landing indicator for airports, comprising a relatively heavy wind direction indicating member, a pilot responsive to wind currents, electric means for moving the indicating member into positional agreement with the pilot, means under the control of the pilot for controlling the first means to maintain such positional accord between the pilot and the indicating member, said pilot controlled means adapted for electric circuit connection with said first means, a manually set means normally in circuit connection with said first means for causing the indicating member to assume a predetermined position in the absence of predetermined wind currents, a switch for bringing the first means into electric circuit with the pilot controlled means to the exclusion of said manually set means, and a wind actuated member operable by such predetermined wind currents for actuating said switch and having a connection therewith permitting of a preliminary movement ineffective on the switch in the absence of such predetermined wind currents.

5. A landing indicator for airports, comprising a relatively heavy wind direction indicating member, a pilot responsive to wind currents, electric means for moving the indicating member into positional agreement with the pilot, means under the control of the pilot for controlling the first means to maintain such positional accord between the pilot and the indicating member, said pilot controlled means adapted for electric circuit connection with said first means, a manually set means normally in circuit connection with said first means for causing the indicating member to assume a predetermined position in the absence of predetermined wind currents, a switch for bringing the first means into electric circuit with the pilot controlled means to the exclusion of said manually set means, a wind actuated member operable by such predetermined wind currents for so actuating the switch, and means for insuring a closing of the switch upon a predetermined actuation by said wind actuated member.

6. A landing indicator for airports, comprising a relatively heavy wind direction indicating member, a pilot responsive to wind currents, electric means for moving the indicating member into positional agreement with the pilot, means under the control of the pilot for controlling the first means to maintain such positional accord between the pilot and the indicating member, said pilot controlled means adapted for electric circuit connection with said first means, a manually set means normally in circuit connection with said first means for causing the indicating member to assume a predetermined position in the absence of predetermined wind currents, wind responsive means operable by such predetermined wind current for electrically connecting the first means to said pilot controlled means to the exclusion of said manually set means whereby the indicating member is caused to follow the pilot in positional agreement therewith, and a telltale indicator accessible when operating the manually controlled means and operatively connected to the indicating member for indicating the position of the latter when in circuit with both the pilot controlled means as well as the manually set means.

7. A landing indicator for airports, comprising a relatively heavy wind direction indicating member, a pilot responsive to wind currents, electric means for moving the indicating member into positional agreement with the pilot, means under the control of the pilot for controlling the first means to maintain such positional accord between the pilot and the indicating member, said pilot controlled means adapted for electric circuit connection with said first means, a manually set means normally in circuit connection with said first means for causing the indicating member to assume a predetermined position in the absence of predetermined wind currents, wind responsive means operable by such predetermined wind currents for electrically connecting the first means to said pilot controlled means to the exclusion of said manually set means whereby the indicating member is caused to follow the pilot in positional agreement therewith, and selective means operable to render either the pilot controlled means or the manually set means wholly ineffective manual or wholly automatic in action.

8. A landing indicator for airports comprising a relatively heavy rotatable wind direction indicator, pilot means directionally responsive to wind currents, actuating means for moving the indicator to indicate the landing direction, means controlled by the pilot means to cooperate with said actuating means for maintaining positional agreement between the pilot means and indicator when the pilot controlled means is operatively related to said actuating means, preselective means for effecting operation of the actuating means for moving the indicator to a predetermined position when said pilot controlled means and said actuating means are not operatively related, and wind actuated means normally inoperative but operable by a wind greater than a predetermined velocity for establishing an operative relation between the actuating means and said pilot controlled means, said wind actuated means having the initial idling movement for a wind less than such predetermined velocity embodying means for disrupting the operative relationship between said preselective means and said actuating means when the pilot controlled means is operatively related to the actuating means.

ARTHUR M. WILHELM.
EDWIN L. ROSE.